United States Patent [19]

Spencer et al.

[11] Patent Number: 5,326,077
[45] Date of Patent: Jul. 5, 1994

[54] BUTTERFLY VALVE SEAL RETAINER

[75] Inventors: William R. Spencer, Springdale; Edwin K. Miller, West Chester, both of Ohio

[73] Assignee: General Electric Company, Cincinnati, Ohio

[21] Appl. No.: 131,179

[22] Filed: Oct. 4, 1993

[51] Int. Cl.⁵ ................................ F16K 1/22
[52] U.S. Cl. ...................... 251/306; 251/317
[58] Field of Search ................ 251/306, 307, 317

[56] References Cited

FOREIGN PATENT DOCUMENTS 7341475  4/1977  France ................ 251/307

Primary Examiner—John C. Fox
Attorney, Agent, or Firm—Jerome C. Squillaro; Bernard E. Shay

[57] ABSTRACT

A butterfly valve comprises a butterfly vane including a radial notch. A seal groove is situated in the vane and a seal including tabs is disposed within the seal groove wherein the tabs are adapted to fit within the notch. The tabs are designed to bear against the sides of the notch. The notch is located on the high pressure side of the butterfly vane and in a position such that the butterfly housing limits the radial motion of the tabs when the valve is in the open position.

9 Claims, 1 Drawing Sheet

BUTTERFLY VALVE SEAL RETAINER

BACKGROUND OF THE INVENTION

The present invention relates to aircraft engine systems and, more particularly, to improved seal retention in high pressure butterfly valves.

Butterfly valves that use a piston ring type seal usually require some kind of positive retention of the seal in the seal groove. A commonly used device is a U-shaped wire which extends axially through the seal and the butterfly. The free ends are bent radially inward to keep the seal retainer in place. In the smaller butterfly valves, the wire retainer becomes fairly small in diameter, on the order of 0.030 inches, because of the narrow radial thickness of the seal. Consequently, shearing or wearing commonly causes early failure. If the retainer fails, or a retention is not used, high pressure drops can pull the seal out of the groove and jam the valve.

The current butterfly valve vane requires a two piece design with an "L" shaped seal ring to properly seal the valve. As the butterfly valve closes, there can be a high pressure differential created from the upstream side of the vane to the downstream side of the vane. This creates a force capable of pushing the seal out of the groove in the vane. Approaching the closed position, the seal begins to rub the converging wall of the housing bore, creating a friction load which can bend the seal over the edge of the seal groove and destroy the seal. A two piece butterfly vane is one way to capture the seal, providing full perimeter capture of the seal. Unfortunately, the "L" shaped seal design is expensive to manufacture, due to both the more complicated seal configuration and the need to machine two interfacing surfaces into a two piece vane.

It is therefore highly desirable and an object of the present invention to provide an improved butterfly valve seal retainer to retain the seal in the seal groove.

Another object of the present invention is to provide such a seal retainer which is capable of sustaining increased wear and load without failing.

Another object of the present invention is to provide a more cost effective means for capturing a butterfly seal for high pressure valve applications.

Another object of the present invention is to provide such a seal which has a longer seal and valve life.

These objects and other features and advantages will become more readily apparent in the following description when taken in conjunction with the appended drawings.

SUMMARY OF THE INVENTION

The present invention has been developed to fulfill the needs noted above. The present invention is a self-retaining butterfly valve seal capable of retaining the seal in a seal groove. Tabs on the seal combined with a notch in the vane capture the seal when the vane is in the bore of the valve housing. Thus, the seal is captured and cannot be forced out of the groove under high pressure loads.

In accordance with a particular embodiment of the present invention, a butterfly valve comprises a butterfly vane including a radial notch and a seal groove in the vane. A seal includes tabs disposed within the seal groove. The tabs are adapted to fit within the notch and designed to bear against the sides of the notch. The notch is located in a position such that the butterfly housing bore limits the radial motion of the tabs when the valve is in the open position. Finally, the notch is located on the high pressure side of the butterfly vane.

In the drawings as hereinafter described, a preferred embodiment is depicted; however, various other modifications and alternative constructions can be made thereto without departing from the true spirit and scope of the invention.

DETAILED DESCRIPTION OF THE PREFERRED EMBODIMENTS

A typical butterfly valve comprises a rotatable vane within a housing. Rotating the vane changes the effective flow area of the valve in order to control a fluid flow. A shaft through the small bore in the vane provides the axis of rotation. A keying arrangement can be used to lock the shaft to the vane.

Figure 1:
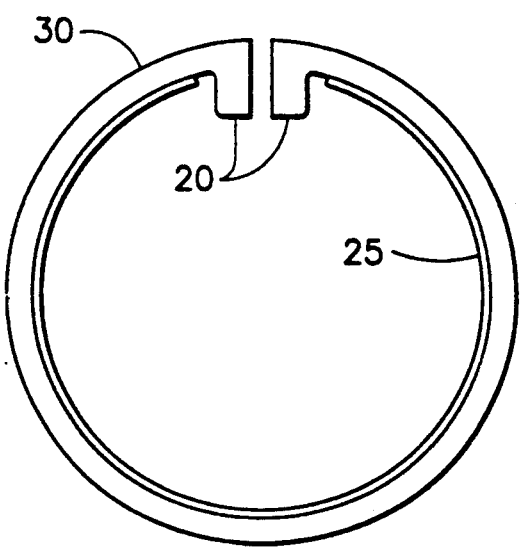
FIG. 1 illustrates a seal and expansion spring for the self-retaining butterfly valve seal of the present invention.

Referring now to the drawings, in FIG. 1 there is illustrated a seal 30 and expansion spring 25 for a self-retaining butterfly valve seal according to the present invention. This eliminates the currently required two piece butterfly vane design for sealing the valve. As the butterfly valve closes, there can be a high pressure differential created from the upstream side of the vane to the downstream side of the vane. This creates a force to push the seal out of the groove in the vane. Tabs 20 may be included in a preferred embodiment to improve seal 30 retention in such high pressure butterfly valves.

Figure 2A:
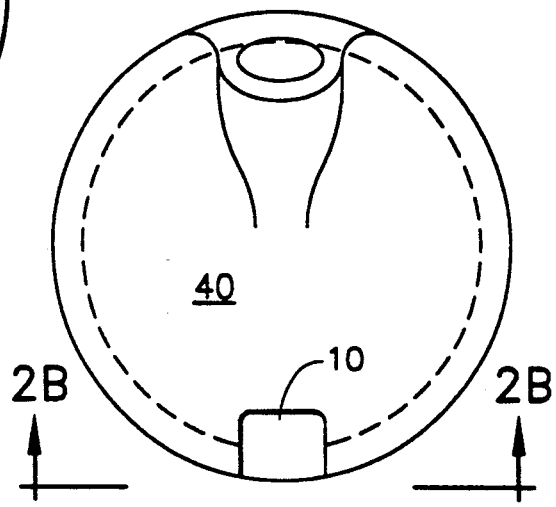
FIGS. 2A and 2B illustrate a top and side views of a butterfly valve vane.
Figure 2B:
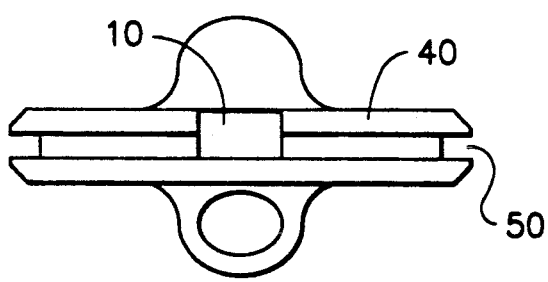

Continuing with FIG. 1 and referring to FIGS. 2A and 2B, top and side views, respectively, of a butterfly valve vane 40 are illustrated. The butterfly vane 40 in FIGS. 2A and 2B includes a radial notch 10 and a seal groove 50, in accordance with the present invention.

Figure 3:
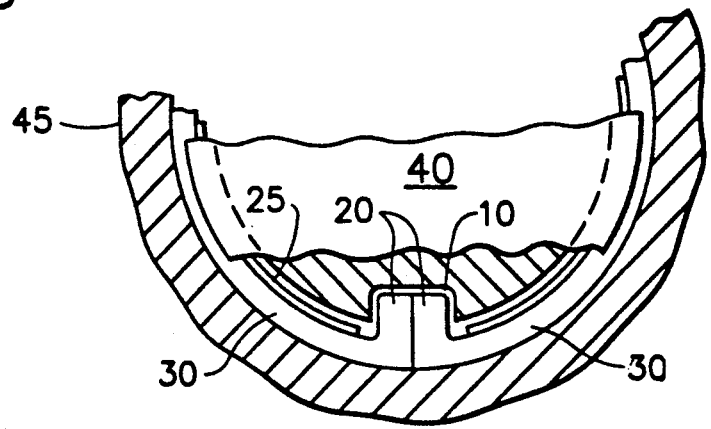
FIG. 3 is a partial cross-sectional view of the self-retaining butterfly valve seal according to the present invention.

Continuing with FIGS. 1, 2A, and 2B, and referring to FIG. 3, the notch 10 in the vane 40 is positioned to be near a wall of the butterfly valve housing 45 in the open position of the vane. This prevents the tabs 20 from being pulled out of the notch 10 radially. The fit of the seal tabs 20 in the notch 10 limit the motion of the seal 30 relative to the vane 40 at right angles to the axis of the tabs 20. By locating the notch 10 on the upstream side of the vane 40, any pressure differential would help keep the tabs 20 in the notch 10.

Tabs 20 on the seal 30 fit within the notch 10 in the butterfly vane 40 to capture the seal 30 when the vane 40 is in the bore of housing 45. Thus, the seal 30 is captured and cannot be forced out of the seal groove, even under high pressure loads. The tabs 20 are designed to bear against the sides of the notch 10, and the notch 10 is aligned with the axis of rotation of the vane 40.

The butterfly valve of the present invention comprises a butterfly vane located in a housing and having a seal groove disposed therein. A seal for the butterfly valve includes tabs disposed within the seal groove wherein the tabs are adapted to fit within the notch. The tabs are designed to bear against the sides of the notch. The notch, situated on the high pressure side of the butterfly vane, is located in a position such that the butterfly housing bore limits the radial motion of the tabs when the valve is in the open position.

It is seen from the foregoing, that the objectives of the present invention are effectively attained, and, since certain changes may be made in the construction set forth, it is intended that matters of detail be taken as illustrative and not in a limiting sense.

What is claimed is:

1. A butterfly valve comprising:
    a butterfly vane including a radial notch;
    a seal groove in the vane; and
    a seal including tabs disposed within the seal groove wherein the tabs are adapted to fit within the notch.

2. A butterfly valve according to claim 1 wherein the tabs are designed to bear against the sides of the notch.

3. A butterfly valve according to claim 1 wherein the butterfly vane is located in a butterfly housing having a bore.

4. A butterfly valve according to claim 3 wherein the notch is located in a position such that the butterfly housing bore limits the radial motion of the tabs when the valve is in the open position.

5. A butterfly valve according to claim 1 wherein the notch is located on a high pressure side of the butterfly vane.

6. A seal retention method for retaining a seal in a high pressure butterfly valve comprising the steps of:
    providing a rotatable vane located within a housing having a bore, the vane including a radial notch;
    providing a seal groove in the vane; and
    adapting tabs disposed within the seal groove to fit within the notch and capture the seal when the vane is in the bore of the housing.

7. A seal retention method according to claim 6 wherein the tabs are designed to bear against the sides of the notch.

8. A seal retention method according to claim 6 wherein the notch is located in a position such that the housing bore limits the radial motion of the tabs when the valve is in the open position.

9. A seal retention method according to claim 6 wherein the notch is located on a high pressure side of the vane.

* * * * *